United States Patent
Knodt

(10) Patent No.: US 7,856,400 B2
(45) Date of Patent: Dec. 21, 2010

(54) BILLING BASED ON THE TYPE OF PRINTED DOCUMENT

(75) Inventor: Kurt Knodt, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 30 days.

(21) Appl. No.: 11/829,604

(22) Filed: Jul. 27, 2007

(65) Prior Publication Data

US 2009/0030837 A1  Jan. 29, 2009

(51) Int. Cl.
*G06Q 40/00* (2006.01)
(52) U.S. Cl. .......................... 705/40; 705/41
(58) Field of Classification Search .............. 705/10–44
See application file for complete search history.

(56) References Cited

U.S. PATENT DOCUMENTS

| | | | |
|---|---|---|---|
| 4,229,100 A | 10/1980 | Travis | |
| 4,313,673 A | 2/1982 | Wartinger et al. | |
| 5,532,920 A | 7/1996 | Hartrick et al. | |
| 5,826,244 A * | 10/1998 | Huberman | 705/37 |
| 5,832,460 A | 11/1998 | Bednar et al. | |
| 6,023,499 A | 2/2000 | Mansey et al. | |
| 6,052,547 A | 4/2000 | Cuzzo et al. | |
| 6,078,906 A * | 6/2000 | Huberman | 705/37 |
| 6,102,287 A | 8/2000 | Matyas, Jr. | |
| 6,112,039 A | 8/2000 | Salgado et al. | |
| 6,216,113 B1 * | 4/2001 | Aikens et al. | 705/34 |
| 6,411,697 B1 | 6/2002 | Creamer et al. | |
| 6,591,253 B1 | 7/2003 | Dinkin et al. | |
| 6,701,845 B2 * | 3/2004 | Ohmura | 101/484 |
| 6,795,205 B1 * | 9/2004 | Gacek | 358/1.15 |
| 6,801,333 B1 * | 10/2004 | Weiss | 358/1.15 |
| 6,844,937 B2 | 1/2005 | Dempsey et al. | |
| 6,941,272 B2 | 9/2005 | Dutta | |
| 6,968,150 B2 * | 11/2005 | Ferlitsch | 399/403 |
| 7,020,408 B2 | 3/2006 | Lester et al. | |
| 7,082,408 B1 | 7/2006 | Baumann et al. | |
| 2003/0140185 A1 | 7/2003 | Cherry | |
| 2004/0008368 A1 * | 1/2004 | Plunkett et al. | 358/1.15 |
| 2005/0039091 A1 | 2/2005 | Hanaoka | |
| 2006/0215192 A1 | 9/2006 | Nagahara | |
| 2007/0103716 A1 | 5/2007 | Shiraiwa | |

OTHER PUBLICATIONS

Communication received from Application No. 08160808.5-2221 dated Mar. 26, 2009, 6 pages.

* cited by examiner

*Primary Examiner*—Frantzy Poinvil
(74) *Attorney, Agent, or Firm*—Hickman Palermo Truong & Becker LLP; Daniel D. Ledesma

(57) ABSTRACT

Techniques are provided for billing a customer for printing services based on the type of document printed. Types of documents may include business cards, books, postcards, photographs, marketing materials, word processing documents, etc. Thus, for example, each photograph is billed at a different rate than each business card.

31 Claims, 4 Drawing Sheets

BILLING BASED ON THE TYPE OF PRINTED DOCUMENT

FIELD OF THE INVENTION

The present invention relates to billing for printing services.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

For printing device manufacturers (or vendors who service and support printing devices), many different billing models are used to generate revenue from their respective printing devices. At the "low-end" (e.g., home user or desktop printer user), one billing model focuses on the sale of the consumables (e.g., toner, ink, fusers, drums, cleaners) for the device as the primary mode of revenue generation. Another billing model at the low-end focuses on offering extended warranties in return for service and support.

In the professional printing environment (i.e., the "high-end"), more responsive service and support is often needed. Thus, support plans and billing models may focus on both consumable usage as well as service and support.

One goal of a printing device manufacturer (hereinafter referred to as a "print vendor") is to charge customers for the "wear and tear" of a printing device, referred to hereinafter as "machine usage." One possible measure of machine usage is consumable usage. However, consumable usage tends to be highly unpredictable for a print vendor because consumable usage can vary considerably from one type of printed document (e.g., a book) to another type of printed document (e.g., a photograph).

Another rough measure of machine usage is the number of sheets that are fed through the printing device. Thus, customers may be charged for the number of sheets that are required for printing documents. The charge for a single printed sheet is known as a "click charge."

Most printing devices have some type of built in "page counter," which is also referred to as a "billing meter" or a "click counter." A page counter tracks the number of sheets that are printed. A printing device may have a different page counter for each sheet size and for color prints. For example, a click charge for each monochrome letter size sheet costs the customer $0.05, whereas a click charge for each color letter size sheet costs the customer $0.085. One page counter might track how many monochrome letter size sheets were printed while another page counter might track how many color letter size sheets were printed. At regular intervals, a print vendor might read the various page counters on a printing device and bill the customer for the usage of the printing device based on the each page counter and the click charge associated with each page counter. Often, a monthly fee is charged in addition to the overall click charge.

Because page counters are a rough measure of machine usage, many printing devices have recommended service actions at specific page counter values. For example, general maintenance might be performed at 60,000 prints. From a customer's perspective, billing based on page counters is more reliable than billing based solely on consumable usage because the cost of a printed sheet is well defined. If a customer were required to buy consumables separately, then the cost per sheet could vary considerably from one type of printed document to another because the amount of consumables used (e.g., toner, ink) can vary from one type of printed document to another. For example, printing photographs typically requires more consumables than a typical printed page of a manual. Thus, in the professional digital printing market, billing models that have attempted to account for consumable usage have generally been unsuccessful, which is most likely due to the variable and unpredictable cost for the professional printer.

While not completely standardized, the page counter billing model has an advantage to the customer in that the billing model allows the customer to compare costs between vendors' products. For example, it might cost $0.05 to print a page on a printing device from vendor X, whereas it might cost $0.08 to print the same size page on a printing device from vendor Y.

One disadvantage of the page counter billing model is that the model is based on sheet size. Thus, the cost of printing a particular document can vary significantly based on the sheet size used. For example, color business cards printed on letter-sized sheets would have a different cost than the same color business cards printed on a 12×18 sized sheet. In many cases, this billing model drives the professional printer to use larger sheet sizes and imposition to print multi-up documents in order to lower the cost of the printed document, which increases labor costs. "Imposition" refers to the printing of multiple documents on a single sheet in a particular order so that the multiple documents come out in the correct sequence when the sheet is cut and folded. Encouraging a professional printer to use larger sheet sizes and imposition also makes computing the costs of printing documents more complex since different sheet sizes may be used.

SUMMARY

Techniques are provided for billing a customer for document services. The cost of printing a document is based, at least in part, on the type of documents printed. Different types of documents may include business cards, postcards, books, photographs, and marketing materials. Thus, even though a set of photographs may be printed on a number of sheets and a set of business cards may be printed on the same number of sheets, the cost for printing each set may vary widely.

In one approach, a first amount is calculated according to a page counter billing model and a second amount is calculated according to a billing model that accounts for the type of document printed. If the second amount is less than the first amount, then a customer may be refunded the difference or may have a credit applied to the customer's bill or account for the difference.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
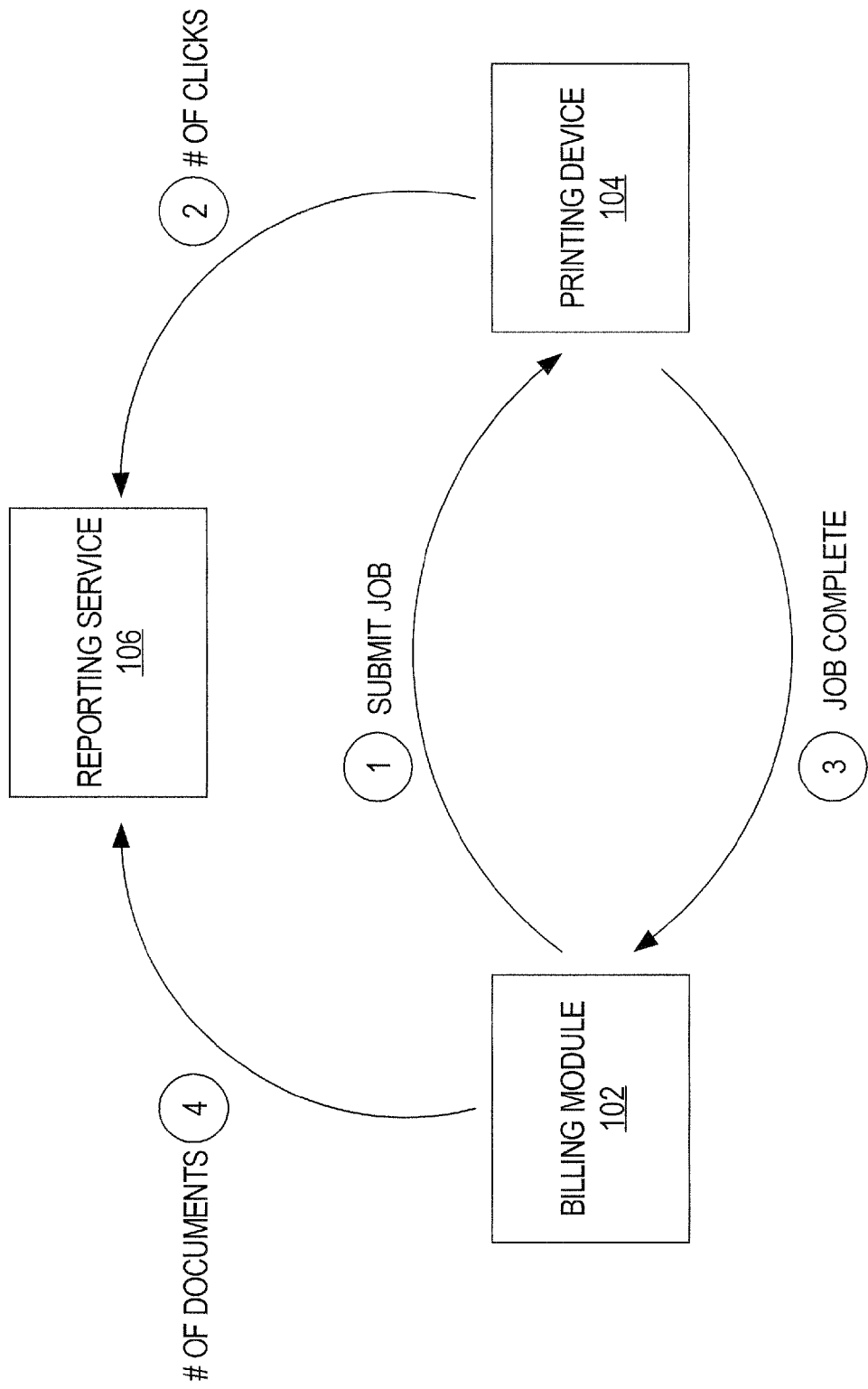
FIG. 1 is a system diagram that illustrates how billing information is sent to a print vendor, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Application Billing

According to an embodiment of the invention, customers (i.e., users) of printing devices are billed based, at least in part, on the type of documents printed and the number of printed documents of each type. This type of billing is referred to hereinafter as "application billing" where "application" refers to the type of document. Thus, customers are not billed based solely on the number of sheets printed and the sheet size used. Billing that is based primarily on the number of sheets printed and, optionally, on sheet size (without taking into account the type of document printed) is referred to hereinafter as "page counter billing."

Non-limiting examples of types of documents (or applications) include business cards, photographs, books, postcards, brochures, manuals, newsletters, catalogs, booklets, envelopes, labels, flyers, pamphlets, ID cards, any type of marketing material, and any combination or variation of the above. For example, each printed business card costs a customer $0.01 while a 50-page book costs $1. A business card is one application and a book is another application. Thus, a document type, or application, is not just a sheet from the printer.

In addition to billing based on the application, other factors may be taken into account when billing a customer. Non-limiting examples of other factors include two-sided/one-sided, color/black and white, (e.g., UV) coatings, embossings, and laminations.

As used hereinafter, a "document" refers to a single completed document of a particular type, regardless of the number of sheets required to print the document. Examples of a single document include a single business card and a single book. In many cases, a document is either (1) cut from a sheet where one or more of these documents have been printed on a single sheet or (2) from multiple sheets that are assembled into one final document. Thus, a document does not necessarily correspond to a PDF (or other type of PDL) document. A single PDF file may correspond to a single printed document. However, that is not always the case. For example, a book may be created from multiple PDF files. As another example, multiple business cards may be created from a single PDF file.

As used hereinafter, a "set of documents" refers to the completed documents (of a particular type) for a particular print request. The "number of documents" refers to the number of documents in a set of documents. For example, a particular print request is for 100 business cards. In this example, the "set of documents" refers to the 100 business cards and the "number of documents" is 100.

As used hereinafter, a "sheet" refers to a singe printed sheet. A sheet has multiple attributes, such as size (e.g., 8.5× 11, 11×17, and 12×18), weight, and color. For relatively simple documents (or applications), such as business cards and photographs, only one sheet size is typically is used to create the finished application. For relatively complex applications, such as books, multiple sheet sizes are typically used to create the finished application.

As used hereinafter, "pages" refers to a number of pages in a completed document. Pages are typically referred to in the context of a book. The number of sheets required to print a multiple-page document, such as a book, is not necessarily the same as the number of pages in the completed book. For example, a 100-page book may have only required 25 sheets.

Application Billing on a Legacy System

In one embodiment, an application billing model may be implemented in conjunction with an existing billing model, such as page counter billing. A billing module computes a first amount according to a page counter billing model, i.e., by determining the number of sheets that were used for a particular print job. The billing module also computes a second amount according to an application billing model, i.e., by determining the type and number of documents printed. The billing module then determines the difference between the first amount and the second amount.

For any determined difference, the billing module (or another module related to billing) may then (1) issue a refund to the customer, (2) apply a credit to the bill of the customer, or (3) apply a credit to the account of the customer.

Application Counter

In an embodiment, a different counter is maintained for each application (or type of document) in order to track the number of documents of a particular type that are printed. Such a counter is referred to hereinafter as an "application counter." For example, one application counter might be maintained for photographs, another for postcards, another for business cards, another for text documents, and another for books.

Application Templates

In an embodiment, a set of application templates are provided to a user (e.g., the customer, or an associate thereof) of the printing device. Each application template corresponds to a different application (or type of document). With a user interface provided by a program that provides multiple application templates, a user selects a particular application template. Such a program is referred to hereinafter as a "print job generator."

At the time a print job is sent to a printing device, the print job generator knows the application being created and the number of documents requested. The print job generator, or a billing module associated with the print job generator, determines an amount to bill for the print job based on the type and number of documents printed. In an embodiment, the print job generator (or billing module) uses the page count (e.g., received from the printing device) and adjusts the final amount to bill for the print job.

For example, a user selects a postcard template to create a postcard print job. The user manipulates a copy of the postcard template to create a particular postcard and selects 50 as the number of postcards to print. After the user creates the postcard print job, the user uses the print job generator to send the print job to the printing device. The print job generator knows that the application is postcards and that 50 postcards are to be printed. Thus, the print job generator (or billing module) determines the amount to bill the customer for that particular print job based on the determination that the application is postcards and the number of postcards is 50. The number of sheets that are used to print the 50 postcards may be taken into account when determining the final amount to bill.

VDP Languages

An example of marketing materials is 1:1 marketing collaterals, such as postcards. Each marketing collateral includes unique information specific to the targeted individual, such as the individual's name and/or picture. Such marketing collaterals are often printed using variable data printing (VDP) languages such as PPML, VIPP, or VPS. VDP enables the mass customization of documents via digital print technology, as opposed to the mass-production of a single document using offset lithography. Instead of producing 10,000 copies of a single document, VDP is used to print 10,000 unique documents with customized messages for each targeted individual.

A printing device that processes print jobs that include a VDP language may track (1) the number of times a VDP language is used, (2) the number of each unique marketing piece, and (3) the number of pages in each marketing piece. Therefore, in an embodiment, an application counter may be assigned to track only print jobs that include a VDP language.

Flexible Application Billing Model

An application billing model is not required to be fixed. Rather, an application billing model may be relatively flexible. In an embodiment, the amount billed per printed document of a particular type varies based on the total number of printed documents of that particular type. For example, as a special promotion, each business card of the first 1000 business cards printed is half (e.g., $0.005) of the normal business card price (e.g., $0.01).

In a related embodiment, the amount billed per printed document of a particular type varies based on the when the documents of that particular type are printed. For example, postcards that are printed during the month of October are half of the normal price.

Costs and Credits

The amount billed for some printed documents may include many additional costs. Non-limiting examples of additional costs include usage of finishing equipment provided by the print vendor, royalty charges, postal costs, and usage of printing equipment provided by another vendor. It is typical for a print shop to outsource specialized printing. For example, a print shop with only digital laser printing equipment may outsource the printing of a cover page of a book that requires very precise color matching typically done on an offset printing press. This type of printing may be an additional charge not comprehended in the application billing.

The amount billed for some printed document may exclude certain costs, such as charges associated with printing equipment provided by another vendor. It is typical for print shops (1) to engage in multi-year leasing arrangements with print vendors or (2) to have purchased equipment from a print vendor. In particular, monochrome laser printers are more of a commodity. Therefore, the billing model may account for leased and purchased equipment (e.g., typically monochrome laser printers) "click charges" from another vendor and factor in such click charges to enable the placement of new equipment in the print shops (e.g., many print shops are acquiring full color laser printing machines).

The amount billed for some printed documents may include credits. For example, if a customer agrees to include one or more advertisements in some printed documents, then the amount billed for those printed documents may account for the one or more advertisements by billing at a lower rate relative to other printed documents of the same type that do not include any advertisements. Advertisements included in printed documents may be provided by a third party who pays the print vendor for the advertisements. The print vendor, in turn, bills the customer less for those printed documents that include any of the advertisements.

For example, company X wants to include a coupon on postcards generated by printing devices of vendor Y. Customer Z leases a printing device of vendor Y. Under normal conditions, vendor Y bills customer Z $0.03 for each printed postcard. Vendor Y informs customer Z that if customer Z includes a coupon from company X on each printed postcard, the billing rate per postcard will be reduced to $0.025. Vendor Y and company X arrange that company X will pay vendor Y $1 for each 100 postcards that include the coupon. In this example, for each 100 postcards that customer Z prints with company X's coupon, vendor Y makes $0.50 and customer Z saves $0.50.

Billing Arrangement

For billing purposes, the type and number of each document printed is tracked so that the print vendor properly bills the customer. Embodiments of the invention are not limited to any particular billing arrangement. As an example of a billing arrangement, a print vendor may gather print statistics from the printing device (or overall print system), which statistics are used to determine how much the print vendor should charge the customer. As another example, the customer may have an account with a (pre-paid) balance. As the customer uses the printing device to generate printed documents, the balance decreases. If the customer desires to generate additional printed documents using the printing device, then the customer pays the print vendor in order to increase the account balance.

System Design

FIG. 1 is a system diagram that illustrates how a print vendor may determine how much to bill a customer, according to an embodiment of the invention. A billing module 102 is communicatively coupled to a printing device 104. Billing module 102 and printing device 104 are each communicatively coupled to a reporting service 106.

The communication links between the components illustrated in FIG. 1 may be implemented by any medium or mechanism that provides for the exchange of data between billing module 102 and printing device 104, between billing module 102 and reporting service 106, and between printing device 104 and reporting service 106. Examples of communication links include, without limitation, a network such as a Local Area Network (LAN), Wide Area Network (WAN), Ethernet or the Internet, or one or more terrestrial, satellite, or wireless links.

Billing module 102 is a program that submits print jobs (or at least tracks print jobs that are sent) to printing device 104. Thus, billing module 102 may receive print jobs from a program (e.g., executing on another machine) that provides application templates from which print jobs are created. Billing module 102 also reports (step 4) the type and number of documents that are printed to reporting service 106.

In an embodiment, billing module 102 executes on the same machine as printing device 104 as a separate process. In a related embodiment, billing module 102 is integrated within the printing functionality of printing device 104.

According to the illustrated embodiment, at step 1, billing module 102 submits a print job, such as 20 postcards on four sheets. At step 2, after printing device 104 prints 20 postcards on four sheets, printing device 104 sends reporting service 106 data that indicates the number of clicks (i.e., four in this example) associated with the print job.

At step 3, printing device 104 sends data that indicates that the print job has successfully completed to billing module 102. Printing device 104 may also send data that indicates the number of clicks to billing module 102.

At step 4, billing module 102 sends reporting service 106 data that indicates that the desired type and number of documents were printed. From the data received from printing device 104 and/or billing module 102, reporting service 106 may determine how much to bill the customer according to an application billing model and, optionally, a page counter billing model. Thus, in this embodiment, the reporting service 106 provides the billing functionality. In another embodiment, billing module 102 provides the billing functionality, i.e., determines how much to bill the customer for the print job. In either embodiment, reporting service 106 may act as a repository to which a vendor may submit queries (e.g., via an Internet connection) to retrieve pertinent billing data.

Figure 2:
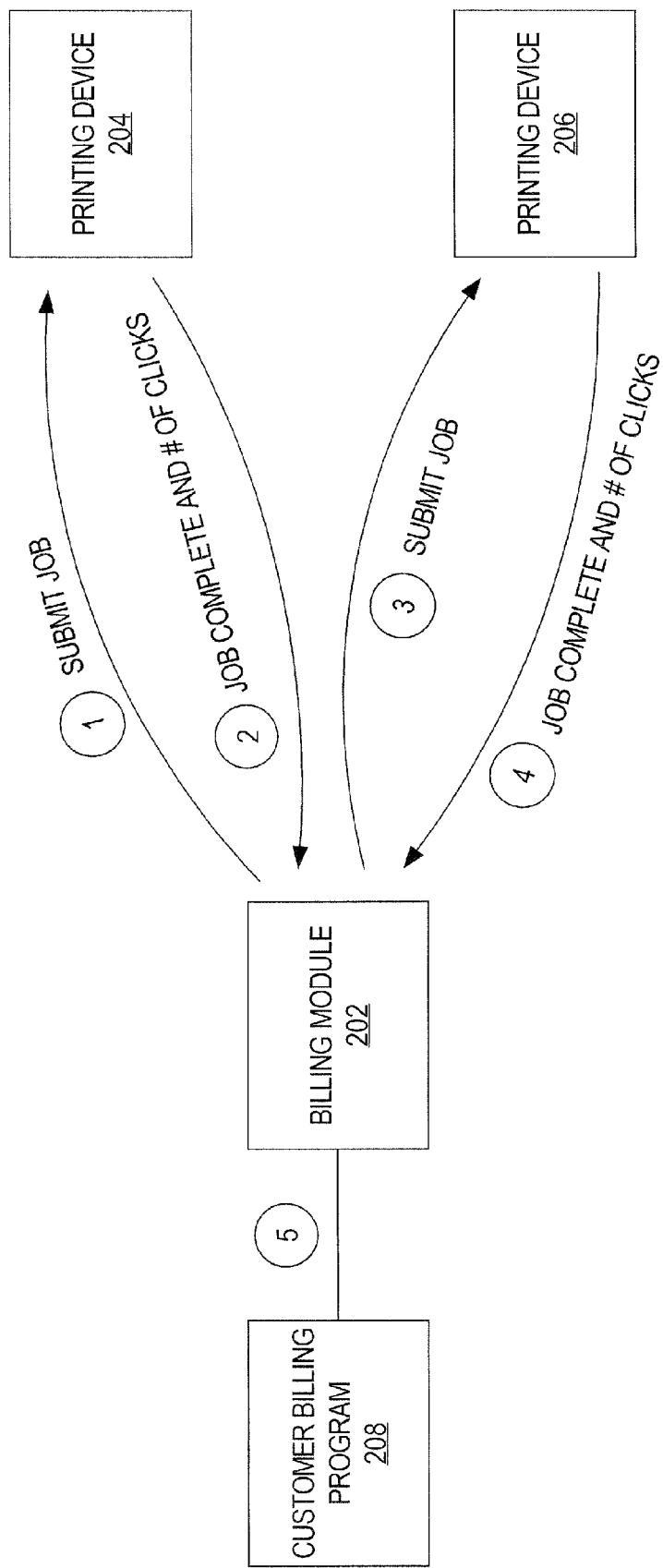
FIG. 2 is a system diagram that illustrates how billing information is sent to a customer, according to an embodiment of the invention.

FIG. 2 is a system diagram that illustrates how billing information is sent to a customer, according to an embodiment of the invention. At step 1, a billing module 202 sends a print job to a printing device 204. At step 2, printing device 204 sends data that indicates that the print job has completed to billing module 202. Printing device 204 also sends data that indicates the number of clicks associated with the print job to billing module 202.

At step 3, billing module 202 sends a second print job to a printing device 206, which may be of a different type, or at least may communicate using a different language, such as job definition format (JDF). JDF is an XML format and technical standard to facilitate cross-vendor workflow implementations. Thus, printing device 204 may communicate in one format while printing device 206 may communicate in a different format.

At step 4, printing device 206 sends data that indicates that the second print job has completed to billing module 202. Printing device 206 also sends data that indicates the number of clicks associated with the second print job, to billing module 202.

At step 5, billing module 202 sends the completed print job information to a customer billing program 208 that analyzes the data to generate billing data for the customer. In a related embodiment, billing module 202 analyzes the data sent to and received from printing devices 204 and 206 to generate billing data for the customer. In either embodiment, customer billing program 208 may act as a repository to which a customer may submit billing data queries (e.g., via a LAN connection) to determine how much they have been (or will be) billed for use of printing devices 204 and 206.

Business Arrangements

In an embodiment, business arrangements are developed such that revenue for specific application usage is shared with other companies or partner companies, such as marketing firms, finishing vendors, and mail server providers. Such companies may develop or contribute to specific print applications that will be created on the print vendor's systems. For example, part of the fee (or total billed amount to the customer) for printing a book may be shared with the publisher that owns the IP rights.

Benefits of Application Billing

An application billing model allows a customer to easily factor in their own costs, such as labor, which typically varies based on the specific print application being created. An application billing model provides a customer a more consistent cost and is more predictable than consumable usage.

Also, application billing allows a customer to use any desired sheet size, without a financial "click" penalty. For example, if a customer wanted to create a 6×9 book, the customer could use a 8.5×11 sheet size without having to perform any imposition or collation. If the customer ran the same job using page counter billing, the cost of creating a 7×10 book may be too high. Instead, the customer would desire to print 2-up pages (e.g., using 17×11 sheets). However, this requires an extra cutting step, which results in more labor and more time. Application billing thus provides a customer with more options and the ability to standardize on a few specific paper sizes for all applications (i.e., types of documents).

Figure 3:
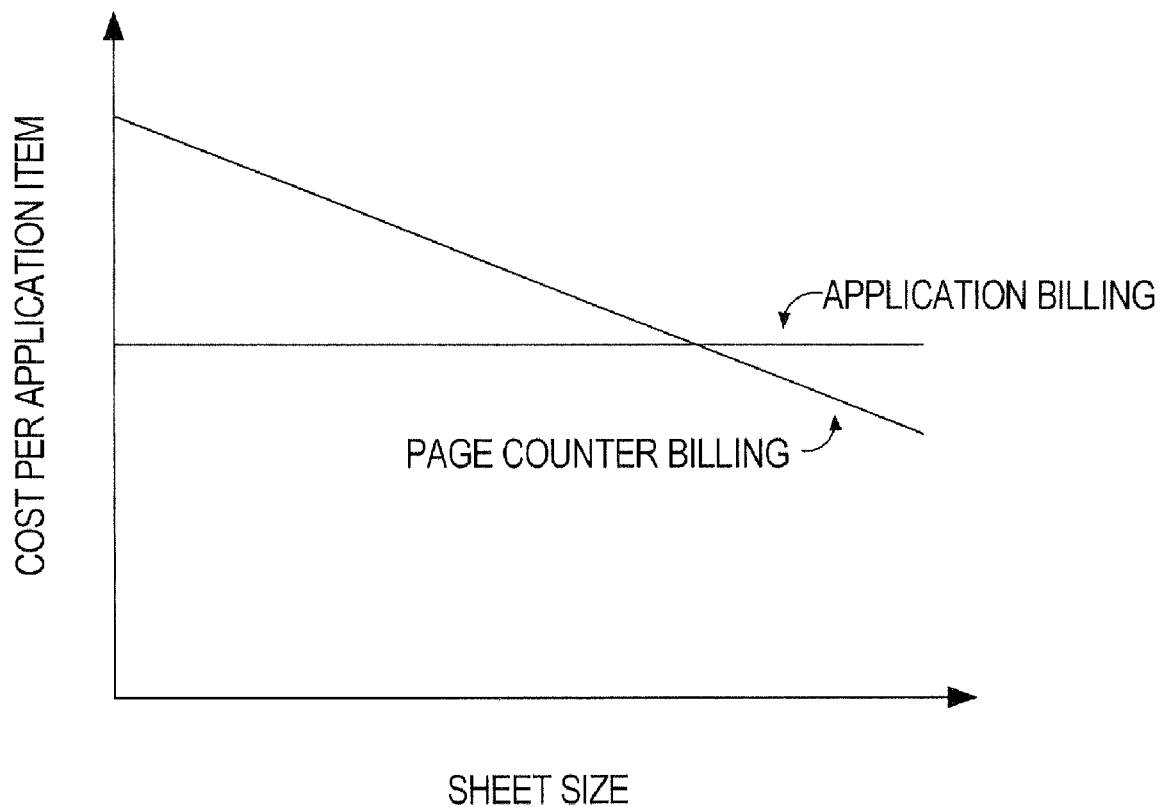
FIG. 3 is a graph that illustrates a cost difference between application billing and page counter billing.

FIG. 3 is a graph that illustrates a cost difference between application billing and page counter billing. As described previously, page counter billing is typically heavily dependent on the sheet size used to print documents. Thus, FIG. 3 illustrates that, under page counter billing, as the sheet size increases for an application (i.e., type of document), the cost for that application decreases. However, the time and labor required to know how to use larger sheet sizes is a non-monetized cost absorbed by the customer, but hidden to the print vendor. On the other hand, as FIG. 3 illustrates, under application billing, the cost of an application may be constant regardless of the sheet size used. Therefore, customers may focus on the number of documents printed of a particular type rather than having to account for the sheet size.

Implementation Mechanisms

Figure 4:
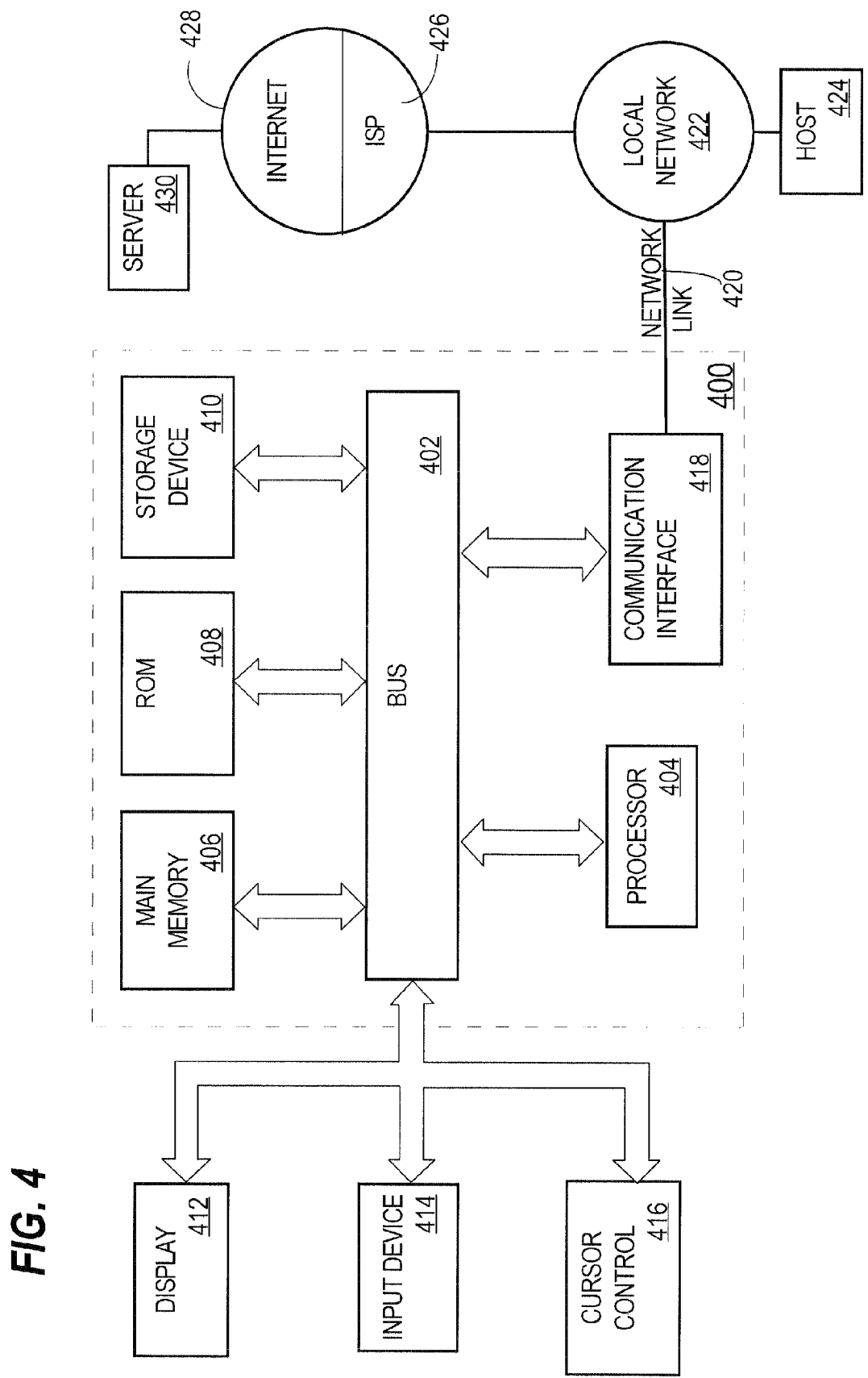
FIG. 4 is a block diagram that illustrates a computer system upon which an embodiment of the invention may be implemented.

The approaches described herein may be implemented on any type of computing platform or architecture. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for tracking printing device usage comprising:
  receiving, at a printing device, a plurality of print jobs;
  maintaining, for the printing device, a plurality of document type counters that includes a first document type counter and a second document type counter;
  wherein the first document type counter (a) corresponds to a first type of document and (b) tracks a number of documents of the first type that are printed at the printing device;
  wherein the second document type counter (c) corresponds to a second type of document that is different than the first type of document and (d) tracks a number of documents of the second type that are printed at the printing device;
  printing, at the printing device, the plurality of documents based on the plurality of print jobs;
  determining that a first print job of the plurality of print jobs is associated with the first type of document;

in response to determining that the first print job is associated with the first type of document, the printing device incrementing the first document type counter;

determining that a second print job of the plurality of print jobs is associated with the second type of document; and in response to determining that the second print job is associated with the second type of document, the printing device incrementing the second document type counter;

wherein a customer uses the printing device;

wherein an amount for a third party to bill the customer for usage of the printing device is determined, based at least in part on, for each document type counter of the plurality of document type counters, a number of documents, of a particular type that were printed at the printing device, indicated by said each document type counter.

2. The method of claim 1, wherein the particular type of document to which said each document type counter corresponds is one of a book, a business card, a photograph, a booklet, a postcard, a brochure, a manual, a newsletter, a catalog, an envelope, a flyer, a pamphlet, or a label.

3. The method of claim 1, wherein the plurality of document type counters are maintained external to the printing device.

4. The method of claim 1, wherein one or more document type counters of the plurality of document type counters are maintained for one or more types of documents with advertising or one or more types of documents generated from print jobs that include a VDP language.

5. The method of claim 1, further comprising determining the amount to bill the customer based at least in part on the plurality of document type counters.

6. The method of claim 5, wherein:
a first request and a second request are included in the plurality of requests;
the first request is to print a first set of documents of a first type;
the second request is to print a second set of documents of a second type that is different than the first type;
the number of sheets required to print the first set of documents is the same as the number of sheets required to print the second set of documents;
the size of the one or more sheets that the first set of documents are printed on is the same as the size of the one or more sheets that the second set of documents is printed on; and
the method further comprising determining a first amount to bill the customer for the first request and a second amount to bill the customer for the second request, wherein the first amount is different than the second amount.

7. The method of claim 5, wherein:
a first request and a second request are included in the plurality of requests;
the first request is to print a first set of documents of a particular type;
the second request is to print a second set of documents of the particular type;
the number of documents in the first set of documents is the same as the number of documents in the second set of documents;
the size of the one or more sheets that the first set of documents is printed on is different than the size of the one or more sheets that the third set of documents is printed on; and
the method further comprising determining a first amount to bill the customer for the first request and a second amount to bill the customer for the second request, wherein the first amount and the second amount are the same.

8. The method of claim 7, wherein the number of sheets required to print the first set of documents is different than the number of sheets required to print the second set of documents.

9. The method of claim 5, wherein:
a first request and a second request are included in the plurality of requests;
the first request is to print a first set of documents of a particular type;
the second request is to print a second set of documents of the particular type;
the number of pages in the first set of documents is different than the number of pages in the second set of documents; and
the method further comprising determining a first amount to bill the customer for the first request and a second amount to bill the customer for the second request, wherein the first amount and the second amount are the same.

10. The method of claim 5, wherein the amount billed per sheet varies from one printed document of one type to another printed document of another type.

11. The method of claim 5, wherein the amount billed for each document, of the plurality of documents, of a particular type varies based on the total number of the documents of the particular type that are printed.

12. The method of claim 5, wherein the amount billed for each document, of the plurality of documents, of a particular type varies based on when each document of the particular type was printed.

13. The method of claim 5, wherein the amount billed for each document, of the plurality of documents, of a particular type includes a portion of the amount for a third party.

14. The method of claim 1, wherein:
the third party is a print vendor; and
the customer purchased or leases the printing device from the print vendor.

15. The method of claim 1, wherein the amount to bill is for at least one of maintenance or service and support rendered by the third party.

16. An apparatus for tracking printing device usage comprising:
a printing device; and
a plurality of document type counters that includes a first document type counter and a second document type counter;
wherein the first document type counter (a) corresponds to a first type of document and (b) tracks a number of documents of the first type that are printed at the printing device;
wherein the second document type counter (c) corresponds to a second type of document that is different than the first type of document and (d) tracks a number of documents of the second type that are printed at the printing device;
wherein the printing device is configured to:
receive a plurality of print jobs to print a plurality of documents, and
print the plurality of documents,
increment, for each document of said each print job of the plurality of print jobs, a document type counter, of the document type plurality of counters, that corresponds to a type of document associated with said each print job;

wherein a customer uses the printing device;

wherein an amount for a third party to bill the customer for usage of the printing device is determined, based at least in part on, for each document type counter of the plurality of document type counters, a number of documents, of a particular type that were printed at the printing device, indicated by said each document type counter.

17. The apparatus of claim 16, wherein the particular type of document to which said each document type counter corresponds is one of a book, a business card, a photograph, a booklet, a postcard, a brochure, a manual, a newsletter, a catalog, an envelope, a flyer, a pamphlet, or a label.

18. The apparatus of claim 16, wherein the plurality of document type counters are maintained external to the printing device.

19. The apparatus of claim 16, wherein one or more document type counters of the plurality of document type counters are maintained for one or more types of documents with advertising or one or more types of documents generated from print jobs that include a VDP language.

20. The apparatus of claim 16, wherein the apparatus is further configured to determine the amount to bill the customer based at least in part on the plurality of document type counters.

21. The apparatus of claim 16, wherein:
the third party is a print vendor; and
the customer purchased or leases the printing device from the print vendor.

22. The apparatus of claim 16, wherein the amount to bill is for at least one of maintenance or service and support rendered by the third party.

23. The apparatus of claim 20, wherein:
a first request and a second request are included in the plurality of requests;
the first request is to print a first set of documents of a first type;
the second request is to print a second set of documents of a second type that is different than the first type;
the number of sheets required to print the first set of documents is the same as the number of sheets required to print the second set of documents;
the size of the one or more sheets that the first set of documents are printed on is the same as the size of the one or more sheets that the second set of documents is printed on; and
the customer is billed a first amount for the first request and a second amount for the second request, wherein the first amount is different than the second amount.

24. The apparatus of claim 20, wherein:
a first request and a second request are included in the plurality of requests;
the first request is to print a first set of documents of a particular type;
the second request is to print a second set of documents of the particular type;
the number of documents in the first set of documents is the same as the number of documents in the second set of documents;
the size of the one or more sheets that the first set of documents is printed on is different than the size of the one or more sheets that the second set of documents is printed on; and
the customer is billed an a first amount for the first request and a second amount for the second request, wherein the first amount is the same as the second amount.

25. The apparatus of claim 24, wherein the number of sheets required to print the first set of documents is different than the number of sheets required to print the second set of documents.

26. The apparatus of claim 20, wherein:
a first request and a second request are included in the plurality of requests;
the first request is to print a first set of documents of a particular type;
the second request is to print a second set of documents of the particular type;
the number of pages in the first set of documents is different than the number of pages in the second set of documents; and
the customer is billed a first amount for the first request and a second amount for the second request, wherein the first amount is the same as the second amount.

27. The apparatus of claim 20, wherein the amount billed per sheet varies from one printed document of one type to another printed document of another type.

28. The apparatus of claim 20, wherein the amount billed for each document, of the plurality of documents, of a particular type varies based on the total number of the documents of the particular type that are printed.

29. The apparatus of claim 20, wherein the amount billed for each document, of the plurality of documents, of a particular type varies based on when each document of the particular type was created.

30. The apparatus of claim 20, wherein the amount billed for each document, of the plurality of documents, of a particular type includes a portion of the amount for a third party.

31. A machine-readable medium storing instructions for tracking printing device usage, wherein the instructions, when processed by one or more processors, causes:
receiving, at a printing device, a plurality of print jobs to print a plurality of documents;
maintaining, for the printing device, a plurality of document type counters that includes a first document type counter and a second document type counter;
wherein the first document type counter (a) corresponds to a first type of document and (b) tracks a number of documents of the first type that are printed at the printing device;
wherein the second document type counter (c) corresponds to a second type of document that is different than the first type of document and (d) tracks a number of documents of the second type that are printed at the printing device;
printing, at the printing device, the plurality of documents based on the plurality of print jobs;
determining that a first print job of the plurality of print jobs is associated with the first type of document;
in response to determining that the first print job is associated with the first type of document, the printing device incrementing the first document type counter;
determining that a second print job of the plurality of print jobs is associated with the second type of document; and
in response to determining that the second print job is associated with the second type of document, the printing device incrementing the second document type counter;
wherein a customer uses the printing device;
wherein an amount for a third party to bill the customer for usage of the printing device is determined, based at least in part on, for each document type counter of the plurality of document type counters, a number of documents, of a particular type that were printed at the printing device, indicated by said each document type counter.

* * * * *